(12) United States Patent
Hall

(10) Patent No.: US 7,890,934 B2
(45) Date of Patent: *Feb. 15, 2011

(54) SYSTEM AND METHOD FOR PERFORMANCE MONITORING

(75) Inventor: Allen Hall, Thousand Oaks, CA (US)

(73) Assignee: International Business Machines Corporation, Armonk, NY (US)

( * ) Notice: Subject to any disclaimer, the term of this patent is extended or adjusted under 35 U.S.C. 154(b) by 705 days.

This patent is subject to a terminal disclaimer.

(21) Appl. No.: 11/986,621

(22) Filed: Nov. 23, 2007

(65) Prior Publication Data

US 2008/0082864 A1 Apr. 3, 2008

Related U.S. Application Data

(63) Continuation of application No. 10/724,327, filed on Nov. 28, 2003, now Pat. No. 7,318,219, and a continuation of application No. 11/906,050, filed on Sep. 28, 2007.

(51) Int. Cl.
G06F 9/44 (2006.01)

(52) U.S. Cl. ................................. 717/127

(58) Field of Classification Search ......... 717/127–128, 717/130–131
See application file for complete search history.

(56) References Cited

U.S. PATENT DOCUMENTS

| | | | |
|---|---|---|---|
| 5,339,398 A | 8/1994 | Shah et al. | 395/400 |
| 5,526,363 A | 6/1996 | Weiss et al. | 370/118 |
| 5,768,500 A * | 6/1998 | Agrawal et al. | 714/47 |
| 5,960,434 A | 9/1999 | Schimmel | 707/100 |
| 5,963,746 A * | 10/1999 | Barker et al. | 712/20 |
| 6,052,697 A | 4/2000 | Bennett et al. | 707/205 |
| 6,067,547 A | 5/2000 | Douceur | 707/100 |
| 6,671,830 B2 | 12/2003 | Kaler et al. | 714/39 |
| 6,687,735 B1 | 2/2004 | Logston et al. | 709/203 |
| 6,718,358 B1 | 4/2004 | Bigus et al. | 718/100 |
| 6,817,011 B1 | 11/2004 | Reynolds | 717/130 |
| 7,076,397 B2 * | 7/2006 | Ding et al. | 702/182 |

(Continued)

FOREIGN PATENT DOCUMENTS

JP 61272831 A 12/1986

(Continued)

OTHER PUBLICATIONS

Justin Zobel, Steffen Heinz, Hugh E. Williams. *In Memory Hash Tables for Accumulating Text Vocabulaires*. Information Processing Letters, vol. 80 No. 6, Dec. 31, 2001, pp. 271-277.

(Continued)

*Primary Examiner*—Anna Deng
(74) *Attorney, Agent, or Firm*—Cantor Colburn LLP; Terry Carroll

(57) ABSTRACT

A system for monitoring a computer software system includes a first user actuated tuning knob for allocating space in memory for performance monitoring; a second user actuated tuning knob for a specifying time out value for in-flight units of work; and a transaction monitor responsive to the first and second user actuated tuning knobs for accumulating in synonym chain cells in the allocated space timing statistics for a plurality of in-flight units of work.

3 Claims, 7 Drawing Sheets

U.S. PATENT DOCUMENTS 7,146,568 B2 * 12/2006 Richardson ................. 715/736
7,292,961 B2 * 11/2007 Dias et al. .................. 702/186
7,370,083 B2 *  5/2008 Husain et al. ............... 709/213

FOREIGN PATENT DOCUMENTS

| | | | |
|---|---|---|---|
| JP | 3042728 A | 2/1991 | |
| JP | 3070032 A | 3/1991 | |

OTHER PUBLICATIONS

Magnnus Karlsson, Fredrik Dahlgren, Per Stenstom. *A Prefetching Technique for Irregular Accesses to Linked Data Structures*. Proceedings Sixth International Symposium on High-Performance Computer Architecture, IEEE Computer Society, Los Alamitos, California. Jan. 8-12, 2000, Toulouse, France. pp. 206-217.

IBM Corporation, *Fast Virtual Address Translation Using Hardware Hashing*, Research Disclosure # 42595, Sep. 1999, pp. 1245-1248.

G. O. Blandy, *Method for Organizing a Hash Table*, IBM Technical Disclosure Bulletin, vol. 38 No. 2 Feb. 1995, pp. 5-8.

D. Cousins et al., "The Embedded Genetic Allocator- A System to Automatically Optimize the Use of Memory Resources in High Performance, Scalable Computing Systems", Proc. IEEE Int. CVonf. Syst. Man, Cybem. vol. 3, pp. 2166-2171. 1998.

J. Arnold. "Tuning Garbage Collection for Java and WebSphere on iSeries". Sep. 2002 (10 pages). Online retrieved at <www.ibm.com/servers/eserver/iseries/perfmgmt/pdf/tuninggc.pdf>.

Blankertz et al. Domino for iSeries Sizing and Performance Tuning. Apr. 2002 (528 pages). Chapters 1-4 extracted (148 pages). Online retrieved at <www.redbooks.ibm.com/abstracts/sg245.162.html>.

* cited by examiner

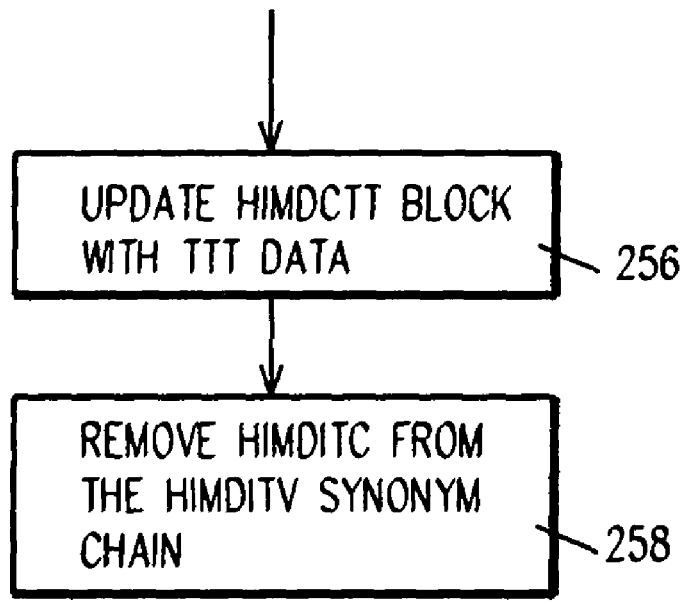
FIG. 5B
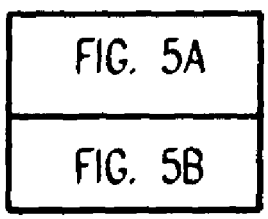

SYSTEM AND METHOD FOR PERFORMANCE MONITORING

This application is a continuation of, and claims priority to, U.S. patent application Ser. No. 10/724,327 filed 28 Nov. 2003 now U.S. Pat. No. 7,318,219 and of Ser. No. 11/906,050 filed 28 Sep. 2007, both by Allen Hall for System and Method for Performance Monitoring.

BACKGROUND OF THE INVENTION

1. Technical Field of the Invention

This invention relates to system performance monitoring. More particularly, it relates to a performance monitor with user adjustable tuning bias.

2. Background Art

Referring to FIG. 1, a system and method for monitoring performance of an information management system (IMS) 106 extends (that is, sets a hook 82 in) IMS subsystem tasks 80 with non-native user code 84 and writes user log records 88 to IMS log 86, then subsequently runs a batch transaction transit time (TTT) calculator program 92 to post-process IMS log 86.

The drawbacks of this technique are several. 1) Transaction transit times are not available in real time. 2) There is a substantial Direct Access Storage Device (DASD) 86 expense for retaining user log records 88 and a substantial subset of other IMS log records 90 required to make the TTT calculations. 3) Processing the collection of log records 88, 90 requires CPU and memory to make transaction transit time calculations. If memory is exhausted, batch program 92 is terminated and TTT calculation cannot continue. 4) Hooking the IMS sub-system could cause IMS subsystem 106 to abnormally terminate since user code 84 runs as an extension to IMS code 80.

Referring to FIG. 2, IBM performance monitor (PM) calculates in real-time (as opposed to batch) transaction transit times (TTTs) 118 for each individual transaction represented by a unique unit of work (UOW) 104 processed by an IMS subsystem 106. An IMS subsystem 106, 108, 110 is a collection of IMS address spaces, each having characteristics similar to IMS performance monitor (PM) address space 108.

Transaction transit time (TTT) calculator task 112 requires more resources than the sum of all other IMS performance monitor tasks combined. The number of units of work (UOW) in-flight 116 at any point in time, available CPU resources 100, and available memory resources 102 vary widely among IMS subsystem installations. IMS subsystem 106, IMS PM address space 108, and IMS PM data space 110 must share CPU resources 100 and memory resources 102 to process and monitor IMS transactions 104. Each in-flight unit of work 116 must be kept track of by in-flight transaction vector 114 and left active in IMS PM data space 110 until it is complete and its transaction transit times 118, including input queue time (IQT) 210, program execution time (PET) 212, and output queue time (OQT) 214 can be calculated.

The nature of performance monitoring is that the monitor itself must not impose more CPU and memory consumption on the system than the reduction realized by using the information it provides to tune the system. Therefore, it is important to provide users a fast-access, low-resource-impact algorithm for maintaining in memory 110 in-flight units of work 116.

SUMMARY OF THE INVENTION

A system and method is provided for monitoring a computer application by adjustably tuning performance evaluation bias between processor and memory consumption; and responsive to that bias, monitoring performance of the computer application with respect to transaction transit time.

In accordance with an aspect of the invention, there is provided a computer program product configured to be operable to monitor a computer application by adjustably tuning performance evaluation bias between processor and memory consumption; and responsive to that bias, monitoring performance of the computer application with respect to transaction transit time.

Other features and advantages of this invention will become apparent from the following detailed description of the presently preferred embodiment of the invention, taken in conjunction with the accompanying drawings.

BRIEF DESCRIPTION OF THE DRAWINGS

FIGS. 5A and 5B are a flow diagram of a process for processing log records.

BEST MODE FOR CARRYING OUT THE INVENTION

| | Glossary |
|---|---|
| CNT | Communication Name Table |
| DQT | Destination Queue Time |
| I/O | Input/Output |
| IMS | Information Management System |
| IQT | Input Queue Time |
| OQT | Output Queue Time |
| PET | Program Execution Time |
| SMB | Scheduler Message Block |
| TTT | Transaction Transit Time |
| TCB | Task Control Block |
| UOW | Unit of Work |
| TTTTOLIM | Transaction Transit Time Timeout Limit |
| TTTDSPSZ | Transaction Transit Time Data Space Size |
| TTTSTATS | Transaction Transit Time Statistics |
| HIMDHDS | This is the name assigned to a data space (DS) block, and is not an acronym, HIMDH being an arbitrary designation |
| HIMDCTT | This is the name assigned to a completed transactions table (CTT), and is not an acronym, HIMD being an arbitrary designation |
| CCPS | Callable Cell Pool Services |

Figure 1:
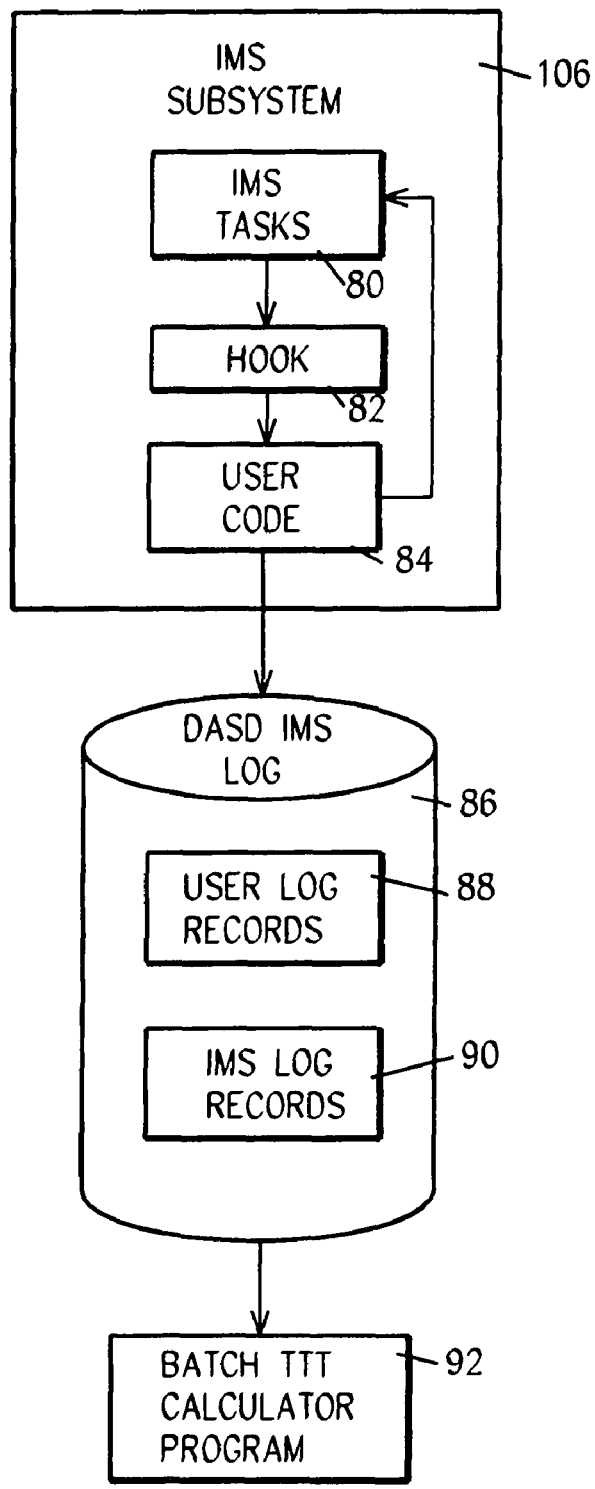
FIG. 1 is a high level schematic representation of a prior art approach for monitoring information management services performance.
Figure 2:
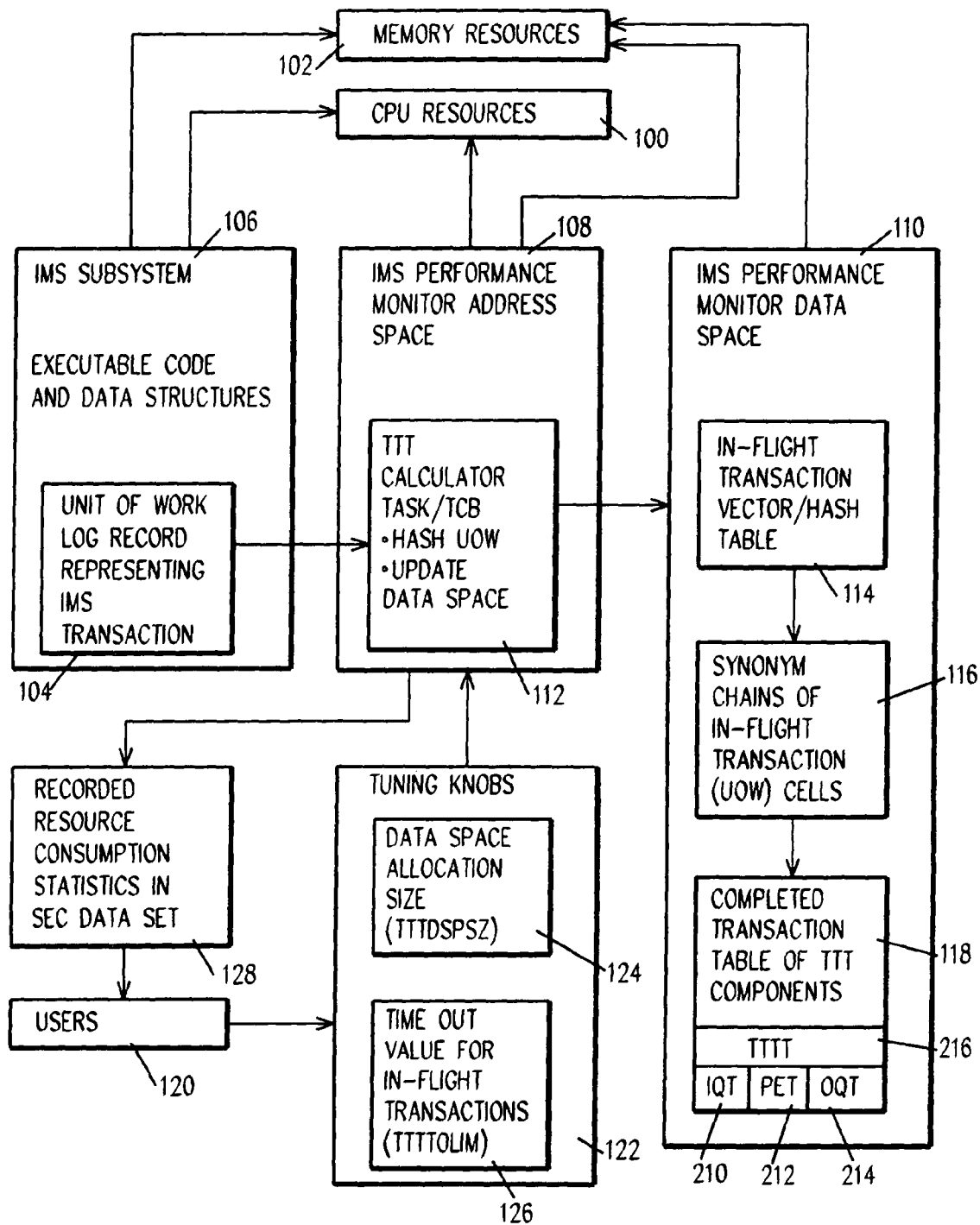
FIG. 2 is a schematic representation of the performance monitor of the present invention.

Referring to FIG. 2, in accordance with the preferred embodiment of the invention, users 120 are provided tuning knobs 122 with which to bias the operation of a performance monitor toward CPU resource consumption (via setting TTT-TOLIM 126) or memory resource consumption (via setting TTTDSPSZ 124) so that the algorithm makes the best use of the CPU and memory resources 100, 102 of a particular installation. Users are provided feedback in the form of resource consumption statistics 128 on the effects of the bias selected so that further refinements can be made. The feedback is recorded over time so that the resource consumption by the algorithm can be examined during times of peak IMS subsystem transaction workload.

If memory resources 102 are exhausted, the algorithm simply waits until more memory 102 is available to continue transaction transit time calculation and informs user 120 that this has occurred. TTT calculator task 112 builds a hash table referred to as in-flight transaction vector 114 which anchors synonym chains of in-flight transaction (UOW) cells 116. These two data structures are implemented in data space 110 using operating system provided facility of callable cell pool services.

Hash tables and synonym chains are commonly used data structures and are described by Donald Knuth, *Art of Computer Programming*.

The performance monitor (PM) address space 108 does not perform Transaction Transit Time calculation as an extension (hook) to IS code 106. It runs under its own task control block (TCB) 112 in its own address space 108 and therefore runs no risk of terminating the IMS subsystem 106 abnormally, which is critical to business operation.

Transaction transit time (TTT) data structure 114 is kept in data space 110. It is primarily a hash table where synonym chains (linked lists) 116 are anchored to vectors in a hash table 114 (See FIG. 3).

Hash table 114 can be tuned for either a CPU 100 or a memory 102 resource constrained system. User 120 provides a number of megabytes (IS PM parameter TTTDSPSZ) 124 to allocate to the data space 110. For each megabyte provided, the hash table 114 has allocated to it 1024 vectors, each anchoring a separate hash, or synonym, chain 116. Each vector 114 is addressed via hashing a transaction unit of work (UOW) ID to a hash key, where there are as many different hash keys as there are vectors in vector table 114. Therefore the number of hash keys is 1024 times the number of megabytes 124 allocated to data space 110. The more keys in hash table 114, the faster the access to the in-flight units of work 116, but at the expense of memory 110. The fewer the keys, the lower the memory usage in the data space 110, but at the expense of CPU 100 consumption to run the hash chains 116 to find the in-flight UOW that must be processed.

Said another way, the higher the percent utilization of memory resources 102 by data space 110 (given as feedback 128), the greater the number of CPU 100 cycles it takes to locate hash table 114 and process each in-flight UOW in synonym chains 116. The inverse also applies, but at the expense of memory resources 102. Therefore, if the system is more memory constrained than processor constrained, user 120 targets for higher percent utilization by setting TTTDSPSZ 124 to a lower number. If the system is more CPU 100 constrained than memory 102 constrained, user 120 targets for a lower percent utilization by setting TTTDSPSZ 124 to a higher number. If the system is both processor and memory constrained, the user may choose to target for around 50% utilization (given as feedback 128) during peak load times of IS in-flight UOWs. If the system is not constrained, TTTDSPSZ 124 is set equal to the maximum allowed.

A second way to tune this structure is via the TTTTOLIM 126 value, which is the time-out value for in-flight unit of work on synonym chain 116. Setting a low number of seconds before timeout (TTTTOLIM) causes a unit of work to be flushed out of the data space 110 sooner thus decreasing % Utilization given as feedback 128.

In this example, the default for TTTDSPSZ 124 is one megabyte, which allows the $HIMDHDS data space 110 to be allocated on any system without user intervention. Users display consumption statistics 128 on a periodic basis by issuing a DISPLAY TTTSTATS command to track percent utilization over the course of an IS subsystem workday. The statistics displayed in Table 1 are appended by monitor 108 to a sequential data set 128 with a time-stamp. Users 120 examine the statistics in Table 1 as appended to sequential dataset 128 and determine if TTTDSPSZ 124 should be increased because % utilization exceeds 50% during peaks in IMS workloads or if it could be reduced thus decreasing memory (data space) 110 usage with no impact to CPU 100 consumption.

Table 1 illustrates two examples of DISPLAY TTTSTATS command outputs.

TABLE 1

| DISPLAY TTTSTATS COMMAND OUTPUTS |
| --- |
| Date: 11/15/2003 Time: 07:04:42 |
| HIM01031 TZETZE: Transaction Transit Time Stats |
| Data space % Utilization (10 Meg): 000% |
| Maximum # Trans In Flight: 00000735 |
| Current # Trans In Flight: 00000458 |
| Possible # Trans In Flight: 00073721 |
| Total Trans Completed Normally: 00013136 |
| Total Trans Completed Timed Out: 00000000 |
| Total Out Limit Secs. (TTTTOLIM): 00086400 |
| Date: 11/15/2003 Time: 10:17:07 |
| HIM01031 TZETZE: Transaction Transit Time Stats |
| Data space % Utilization (10 Meg): 000% |
| Maximum # Trans In Flight: 00000735 |
| Current # Trans In Flight: 00000458 |
| Possible # Trans In Flight: 00073721 |
| Total Trans Completed Normally: 00013987 |
| Total Trans Completed Time Out: 00000000 |
| Time Out Limit Secs. (TTTTOLIM): 00086400 |

As seen in the example of Table 1, the Data space 110 % utilization never reached even 1%. Also, the 10 megabyte data space 110 can accommodate up to 73,721 in-flight transactions 116; that is, 7372 per meg. Since 735 is less than 10% of 73721, then a 1 megabyte data space (very small relative to typical data spaces) is under the 50% target limit. The user would then set TTTDSPSZ 124 equal to 1 to reduce memory usage with virtually no effect on CPU consumption.

Figure 3:
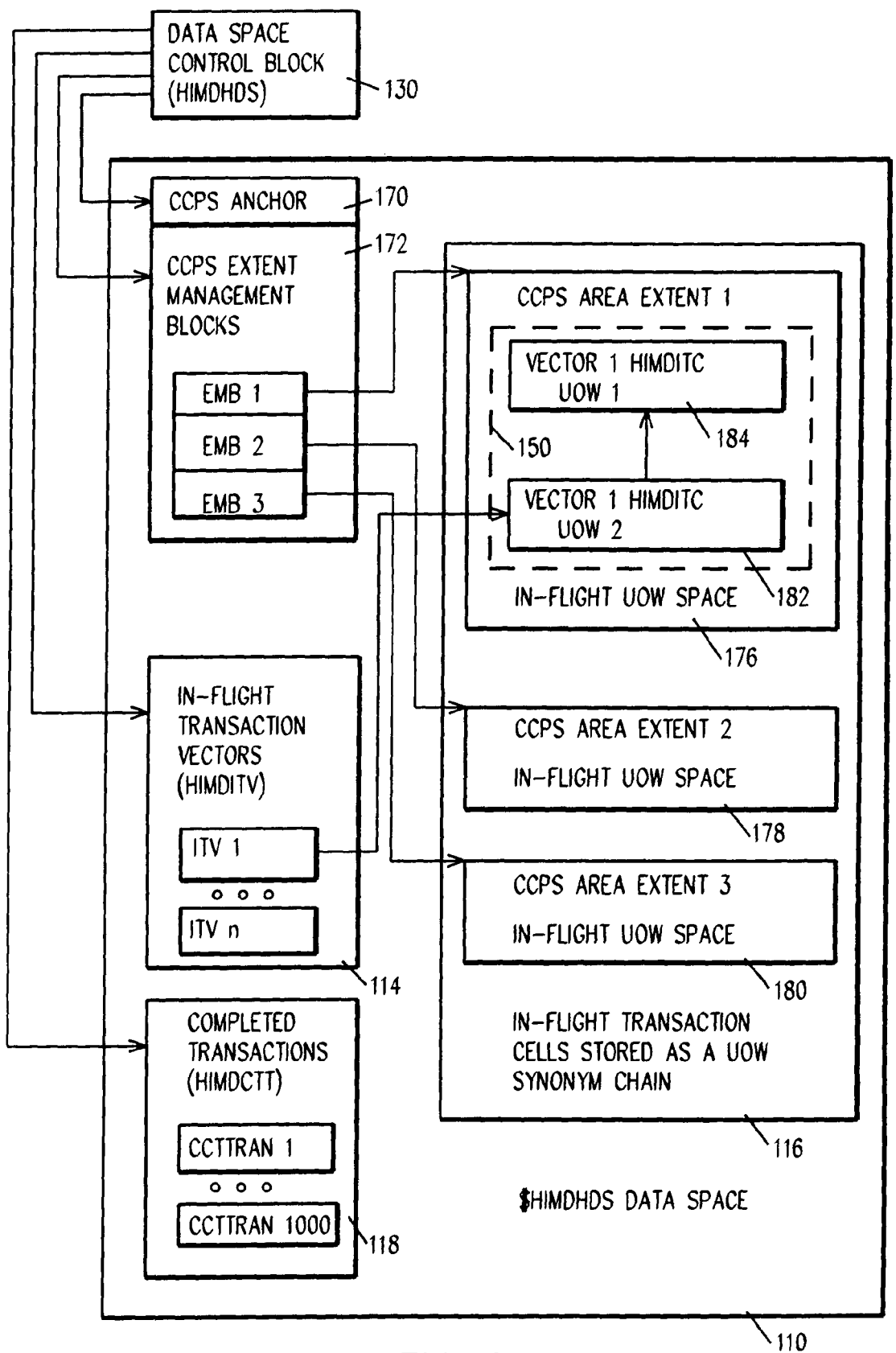
FIG. 3 is a schematic representation of the data space of the present invention.

The four transaction transit time (TTT) components 118 include input queue time (IQT) 210, program execution time (PET) 212, output queue time (OQT) 214, and total transaction transit time (TTTT) 216. In addition, for program switches, the number of switches may be tracked. Maximum, average and minimum values for each of these four components are tracked in a statistics database by calculator task 112. If any of the totals accumulated for any of the TTT 118 components cause overflow (i.e. wrap), then all totals are reinitialized and accumulation begins again. Referring to FIG. 3, IQT 210, PET 212, OQT 214 and TTTT 216 are calculated for each UOW 104 input to a scheduler message block SMB 270 and output to a communication name table CNT 268. Performance monitor 108 is single-tasked, so log records 280 arrive in the order IS creates them.

Referring to FIG. 2, a UOW log record 104 includes length, record type, record subtype, record content, clock, and log sequence number (LSN) fields.

Startup parameters, or tuning knobs, 122 which may be set by user 120 to adjust tuning bias between memory and CPU usage by the performance monitor, include data space size allocation 124, and timeout value 126.

Data space size allocation 124 is the size, in megabytes, allocated to the TAT DH Data space 132. The default is one. Each megabyte can accommodate approximately 7,300 in-flight transaction instance units of work (UOW) 156.

Timeout value 126 for in-flight units of work 116 is the limit in number of seconds (up to 24 hours) a transaction instance, or unit of work (UOW), 116 is allowed to remain in-flight before it is timed out. If the in-transit time of the UOW exceeds TTTTOLIM 126, that is, when current time minus UOW arrival time exceeds the TTTTOLIM 126, it is timed out. Time out means that TTTTOLIM 126 is substituted for either program execution time (PET) 212, if the UOW 116 is still in program execution, or output queue time (OQT) 214 if the UOW is still on the output queue. The UOW being timed out is then considered complete and its input queue time (IQT) 210, PET 212, OQT 214, and TTTT 216 values are accumulated into TTT components database 118 for its associated transaction code. The time out process prevents a single problematic UOW from having a high impact on the averaged TTT components for a particular transaction code.

When viewing in performance statistics 118 the maximum program execution time or maximum output queue time for a transaction code it is possible for user 120 to determine if time out processing occurred for one or more UOW if either of them is equal to TTTTOLIM 126 (converted to milliseconds). The number of UOWs timed out is also part of the view 118. If a UOW times out on the input queue it is flushed since it never actually began execution.

Figure 4:
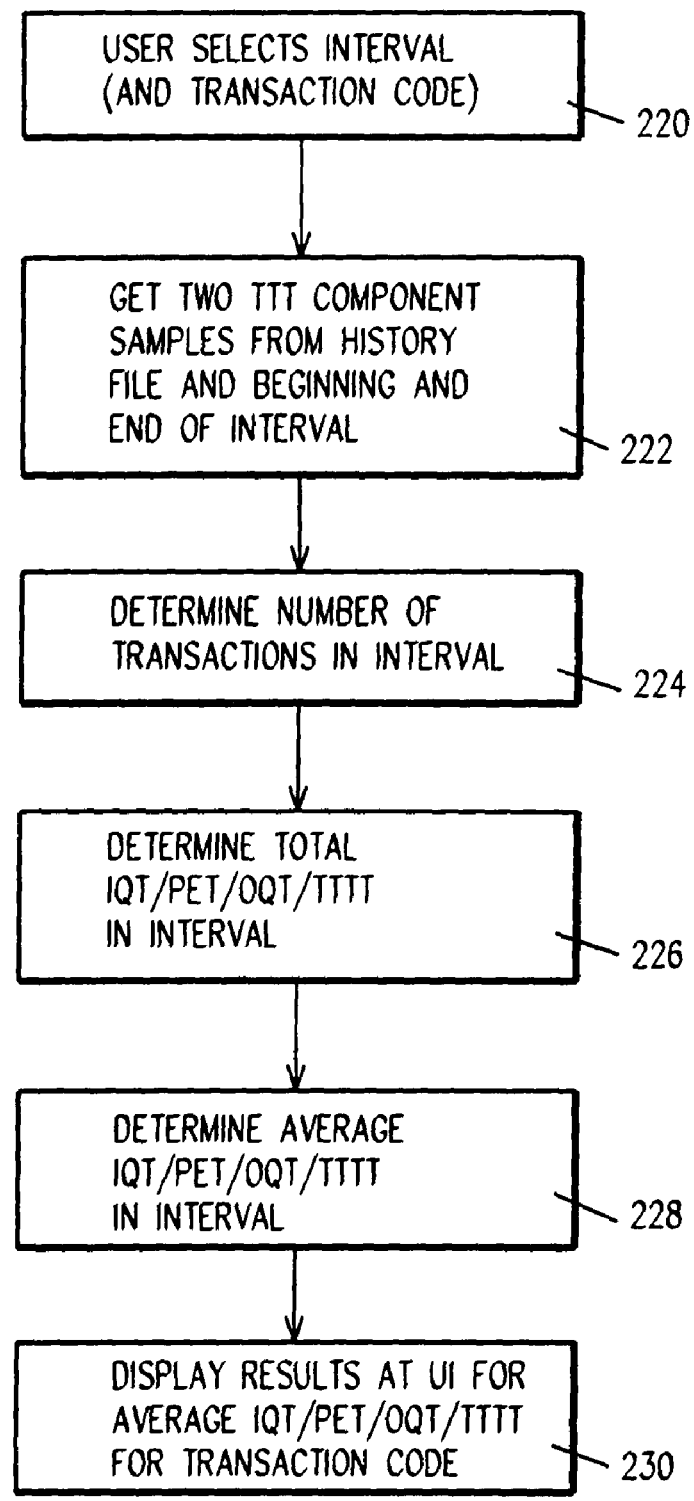
FIG. 4 is a flow diagram of a process for determining the averages of all TTT components for a given UP Interval.

Referring to FIG. 4, by way of example for TTT, averages of all TTT components 118 for a given interval are calculated by PM 108 code as follows:

In step 220, user 120 selects a transaction code and an interval; e.g. between 8:00-a.m. & 9:00 a.m.

In step 222, history file 118 is read to get the two TTT component samples for transaction codes written closest to A) 8:00 and B) 9:00.

In step 224, the number of transactions in the interval is determined: total # transactions in interval=total # transactions from sample B−total # transactions from sample A.

In step 226, the total input queue time 210 is determined: total IQT in interval=total IQT from sample B−total IQT from sample A.

In step 228, the average IQT is determined in the interval: average IQT in interval=total IQT in interval/total # transactions in interval.

In step 230, for average IQT for a particular transaction code, PM displays in columns for transaction codes the total # transactions in interval and the average IQT in interval.

A similar process is used for calculating PET, OQT, and TTTT.

Referring to FIG. 3, all TTT data structures, except HIMDHDS 130, are stored in $HIMDHDS data space 110.

A DISPLAY TTTSTATS command processor is executed to format the statistics that are stored in HIMDHDS block 130 for presentation to user 120 as resource consumption statistics 128.

TTT DH primary memory structures include data space control block HIMDHDS 130, in-flight transaction vectors HIMDITV 114, completed transactions table HIMDCTT 118, and in-flight transaction cells HIMDITC 116, 150.

In-flight transaction cells HIMDITC 116, 150 and their synonym chain vectors in the in-flight transaction vector table HIMDITV 114 function as follows.

When the TTT calculator task 112 is called to integrate a log record 104, in-flight transaction cells (ITCs) 116, 184 for the corresponding UOWs 104 are updated with time stamps from log records 104. UOWs are hashed to one of the 1024 hash keys (or multiple of 1024 thereof) to gain access to the UOW Synonym Chain 116 of ITCs. (The multiple is equal to TTTDSPSZ 124.) This results in more hash keys for larger dataspaces thus keeping the UOW lookups fast in a system which is not memory bound and which is, therefore, tuned to optimize CPU usage.) The hash key is used as an index into HIMDITV 114. HIMDITV 114 contains vectors ITV1 . . . ITVN in an area of data space 110 where synonym chains 116 reside. Synonym chains 116 are made up of linked lists of HIMDITCS 182, 184, one HIMDITC per in-flight UOW and are segregated into 1 megabyte CCPS area extents 176, 178, 180.

When the TTT calculator task 112 is called to return the TTT components 210, 212, 214, 216 of completed transactions, the contents of HIMDCTT table 118 are sent to user 120.

Data space block HIMDHDS 130 contains data space access, performance, usage and user parameter information. It also contains information on the CCPS anchor 170 and the CCPS extent management blocks 172 required for callable cell pool services to manage in-flight transaction cells HIMDITCS 116 in data space 110. Enough information is maintained to allow a user to see when the data space 110 allocated pursuant to TTTDSPSZ allocation size 124 is reaching maximum capacity.

To put a log record into TTT data space 110, an integrate call takes a captured log record and stores its UOW information into the TTT in-flight UOW data structures 114, 116 in data space 110.

During the integrate call TTTTOLIM 126 is used in a garbage collection process to clean up in-flight UOWs 182, 184 that are incomplete due to some type of unexpected, unanticipated, or new IMS workload that does not generate the expected set of log records 104. The time out value TTTOLIM 126 is compared with the difference between the current time and a UOW's arrival time is taken from the log record time stamp in order to determine if the UOW has "Timed Out." This comparison is done for a chain of in-flight transaction cells 116 anchored to its in-flight transaction vector 114 each time a new cell 116 is added to a vector's 114 chain. In this way, garbage collection is not done all at once, but one vector 114 at a time.

Referring further to FIG. 3, in-flight transaction vectors HIMDITV 114 and the initial completed transactions table HIMDCTT 118 are allocated in fixed contiguous virtual addresses below the 1 megabyte line in the $HIMDHDS data space 110 immediately after callable cell pool services (CCPS) control information (including anchor 170 and extent management blocks (EMBs) 172). There is only one CCPS Anchor 170 (64 bytes). There is one CCPS Extent Management Block (EMB1, EMB2, . . . ) 172 per 1 megabyte specified via TTTDSPSZ 124. The remainder of data space 110 is allocated to CCPS to manage the cells used to contain the synonym chains 116 of HIMDITCS 182, 184 and to contain additional HIMDCTT entries 118 should they be required. More HIMDCTTs 118 may be required if more different transaction code names complete than there were HIMDCTT entries CCTTRAN1 . . . CCTTRAN1000 initially allocated. The DCTT 118 is a block of pre-chained CTT entries and more are allocated from cells in data space 110 if required.

At minimum a 1 megabyte data space 110 (actually 239 pages since this is the MVS default for maximum data space size) is allocated and formatted during initialization. These first 239 pages contain CCPS anchor 170, extent management blocks 172 (fixed size), in-flight transaction vectors HIMDITV 114 (variable size), and completed transactions HIM- DCTT 118 (fixed size) with the remainder allotted to cells 116 of HIMDITCS. This 1 meg minimum corresponds to a data space size allocation 124 of TTTDSPSZ=1.

As is illustrated in FIG. 3, for TTTDSPSZ 124 equal to three (3), additional megabytes specified on TTTDSPSZ 124 are broken into 1 megabyte CCPS extent cell areas 178, 180. The new extent areas 178, 180 contain exclusively additional HIMDITC and HIMDCTT cells.

HIMDITCS 182 for a UOW 104 are added to the front of synonym chains 150 anchored in HIMDITV 114. In the example of FIG. 3, currently only two UOWs 182, 184 are in-flight. The most recent UOW 182 added to the chain is the most likely one to complete; i.e. high volume transactions go on and off the synonym chains 150 more frequently than low volume transactions. This results is faster UOW lookups in synonym chain 116. CCPS satisfies consecutive cell requests from adjacent data space virtual addresses. Therefore, adding HIMDITCS 182 to the front of synonym chain 150 yields close proximity page references when accessing a particular synonym chain 150.

When using cell pool services to manage the HIMDITCS 182, 184 in the $HIMDHDS Data space 110, an anchor 170, extent management blocks 172, extents 176, 178, 180, and cells 182, 184 are required. Anchor 170 is, in this exemplary embodiment, 64 bytes. The first extent management block EMB1 requires 128 bytes plus one byte for every eight cells in the first extent 176. Subsequent extent management blocks EMB2, EMB3 each require 128 bytes plus one byte for every eight cells in subsequent 1 megabyte extents 178, 180.

To obtain the location where the first cell storage 184 in the 1st extent 176 starts, add the data space origin Address (0 or 4096)+Anchor Size (64 bytes)+Length Of All Extent Management Blocks+Length of HIMDITV+Length of the HIMDCTT. The address of the end of the last Cell 182 in the first extent 176 is calculated so that a starting point for subsequent Extents 178 is known.

Cell Pool Services Calls are used to build a cell pool (CRSPBLD), add an extent and connect it to its cells (CRSPEXT), get cells for use (CRSPGET) and free cells (CRSPFRE). All extents 176, 178, 180 are connected during the Initialize Call.

HIMDHDS 130 contains information required to allocate, access, and check the performance of the $HIMDHDS Data space 110. The first page of data space 110 is reserved for CCPS control information since it is necessary to know this value (4096) before the calculation of the number of HIMDCTTs 118 that will fit in data space 110.

Table 2 sets forth several HIMDHDS fields that are set during the TTT DH initialization call.

TABLE 2

| HIMDHDS FIELDS | |
|---|---|
| HIMDHDS | DSECT |
| HDSNAME | "$HIMDHDS" Data space Name |
| HDSMSCD | A(HIMMSCD) |
| HDSTOKN: | STOKED |
| HDSTTOK: | TOKEN |
| HDSALET: | LET |
| HDSORIG: | ORIGIN of DSP (0 or 4K) |
| HDSDSPSZ: | TTTDSPSZ In Number of Megabytes (from proclib) |
| HDSTTOLM: | TTTTOLIM = UOW Timeout Value in Seconds. (from proclib) |
| HDSGCOEF: | Garbage Collection Coefficient. Used during TTTTOLIM precessing as a divisor into ITVUOWNM. If the remainder is 0 then the synonym chain is cleared of all UOWA that have Timed Out; e.g. Do garbage |

TABLE 2-continued

| HIMDHDS FIELDS | |
|---|---|
| | collection every 100th time a new UOW is added to a Synonym Chain. |
| HDSDSIZE: | DSP Size = 4K * (239 + ((TTTDSPSZ – 1) × 256))) |
| HDSDITVR | # Rows in the HIMDITV (1024 × TTTDSPSZ) |
| HDSDITVL | HIMDITV Length = (Len(HIMDITV Prefix) + (HDSDITTR * (HIMDITV Row Length)) |
| HDSDCTTR | # Rows in the HIMDCTT at startup |
| HDSDCTTL | HIMDCTT Length = (Length(HIMDCTT Prefix) + HDSDCCTR * (Len(HIMDCTT Row)) |
| HDSDITV@ | A(HIMDITV) = HDSCRESV (> CAPS reserve of 4K) |
| HDSDCTT@ | After HIMDITV@ = (HDSITV@ + HDSITVL) |
| HDSDCST@ | CPPS Cells Starting Address = End of HDSDCTT = HDSDCTT@ + HDCDCTTL |
| HDSDC1ND | =239 * 4K – 1 = End of Cells in First Extent |
| HDSCTEXT: | # CAPS Total Extents (=TTTDSPSZ) |
| HDSCCSZ | Calces = Length(HIMDITC) |
| HDSCANSZ | Size of CAPS Anchor = 64 bytes. |
| HDSCRESV | =4096; Reserve 1 Page for CAPS Control Information |
| HDSC1EXT | # Cells in the 1st extent = (HDSDCEND – HDSCDST@)/HDSCCSZ |
| HDSC1EXS | Size of 1st extent mgt block = 128 + (# Cells in 1st Extent/8) |
| HDSCXEXT | # Cells in subsequent 1 meg extents = (1M – 1)/ HDSCCSZ |
| HDSCXEXS | Size of subsequent extent mgt blocks = 128 + (HDSCXEXT/8) |
| HDSUOWCP | Total number of UOW's added as HIMDCTTs. |
| HDSUOWMX | Max # of UOWA in flight at any one time; CS during Integrate OR Call |
| HDSUOWCR | Current # of UOWA in flight; CS during Integrate OR Call |
| HDSUOWTO | Possible # UOWA in flight; allows for % utilization calculation. |
| HDSUOWGC | # of UOWA flushed during Garbage Collection; UOW was Timed Out, yet not enough info. To be added to HIMDCTT |
| HDSUOWTO | # of UOWA Timed Out yet enough info to be added to HIMDCTT; CS |

In-flight transaction vector table HIMDITV 114 is anchored to the HIMDHDS 130 and has by default 1024× TTTDSPSZ rows. As outlined above, the most precise word of bits in UOW 104, bits 20-51 (with bit 51 incremented every microsecond), are hashed to a hash key from 0-1023 (or TTTDSP multiple thereof). That key is used to locate the HIMDITV 114 vector ITV1 to the associated HIMDITC synonym chain 150 of in-flight UOW 182, 184.

Table 3 sets forth the format of the HIMDITV block 114, which is set up by an initialization call to the TTT calculator task 112.

TABLE 3

| IN-FLIGHT TRANSACTION VECTORS HIMDITV FORMAT | |
|---|---|
| HIMDITV | DSECT |
| ITVPRFX | |
| ADIT.: | "ditv" |
| ITVDHDS@ | Address of HIMDHDS |
| ITVHCTT@ | Address of HIMDCTT |
| ITVUOWNM: | Number of ITVROWS (1024 × TTTDSPSZ) |
| ITVPRFXL#: | Equate Length of ITVPRFX |
| ITVROW | EAU * |
| ITVITCVT | Vector to first HIMDITC in Synonym Chain of HIMDITC cells |
| ITVUMAX | Maximum Number of UOWA In-Flight on Chain at any one time |
| ADVENA | Current Number of UOWA In-Flight on Chain |
| ITVLRNM | Total # UOWA integrated onto Synonym Chain |
| ITVUOWNM: | # Completed UOW taken from Synonym Chain |

TABLE 3-continued

IN-FLIGHT TRANSACTION VECTORS HIMDITV FORMAT

| | |
|---|---|
| ITVFLUSHS | Number of UOW's flushed due to TTTTOLIM including unexpected Log Record patterns/workloads. |
| ITVROW# | Equate Length off ITVROW |

In-flight transaction cells HIMDITC 116 addresses are provided via calls to CCPS and, for example, are part of synonym chains 150 anchored to entry ITV1 in HIMDITV 114. If no matching UOW is found on chain 150, then a new HIMDITC 182 is added to the head of the synonym chain 150.

When a UOW's complete set of log records 104 arrives, TTT calculator task 112 calculates TTT components 210, 212, 214, and 216 and summarizes them in a HIMDCTT 118 entry for the corresponding transaction and corresponding HIMDITC entry 182 is removed from the chain 150. Its cell, say 182, is then returned to CCPS for reuse.

Table 4 sets forth the format of an in-flight transaction cell HIMDITC 116, 182, 184.

TABLE 4

IN-FLIGHT TRANSACTION CELL HIMDITC FORMAT

| | |
|---|---|
| HIMDITC | DSECT |
| ITCNEXT: | Pointer to next HIMDITC on UOW Hash Chain |
| ITCUOW: | 1st 16 bytes of UOW of In-Flight UOW (AMSTEAD + STCK) |
| ITCTRNCD: | Transaction Code of In-Flight UOW |
| ITCFLAGS: | Only In chain 01 Arrived, First in Chain 01 Arrived, Last In Chain 01 Arrived, M.C. Locally Processed, M.C. Externally Processed, Originating Program Switch, Resultant Program Switch |
| ITCLRMSK: | Mask indicating which Log Records have arrived: 01, 03, 35, 31(1), 31(2) |
| ITCTYPE: | Type of Processing UOW involved in: PGMSW, SMQ1IMS, SMQ2IMS |
| ITCIDSTN: | Input CUT/MISNAME to be compared to 35 rec Output CUT/MISNAME |
| ITCARRIV: | U.C. Transaction Arrival Time from 01 |
| ITCS ART: | U.C. Transaction Processing Start Time from Get Unique 31 from DL/I Appl |
| ITCENDT: | U.C. Transaction Processing End Time from 35 when ENQUEUES to CUT/MISNAME |
| ITCOUTQ: | U.C. Output Transaction Sent Time from DC Com. Manager 31 |
| ITCPGMSW: | Number of Program Switches from 03 |
| ITCSEQNM: | last 4 bytes of Log Sequence Numbers 294 of above Log SECS 280 for debugging purposes. |

Completed transaction table HIMDCTT 118, which is displayed to users by IMSPM, is anchored to and positioned after the HIMDITV 116 in the data space 110. Each entry CCTTRAN1 . . . CCTTRAN1000 contains a transaction code and its associated TTT Components 210, 212, 214, and 216. The initial HIMDCTT block 118 has as a somewhat arbitrary (say 1000) but reasonable number of entries. Additional entries are chained in as require when more that 1000 new transaction code names complete. The initialization call to the TTT DH formats the initial HIMDCTT 118 and pre-chains the entries CCTTRAN1 . . . CCTTRAN1000 together.

A new entry is added to the end of the HIMDCTT 118 when a unique transaction code completes. When a UOW 104 completes, this list 118 is scanned for the matching transaction code. The first attempt for a match is at CTTLMTCH which is maintained as the last matching transaction entry. This speeds updates since the last matching transaction is the most likely one to next complete. If this fails, the table 118 is scanned sequentially from the beginning. If the matching transaction code is not encountered then a new CTT 118 ROW CCTTRAN(>1000) is added as a data space 110 cell and chained to the end.

Table 5 sets forth the format of completed transactions table HIMDCTT 118.

TABLE 5

COMPLETED TRANSACTIONS TABLE HIMDCTT FORMAT

| | |
|---|---|
| HIMDCTT | DSECT |
| CTTPRFX | CTT Prefix Containing Status Information |
| CTT ID | "dctt" |
| CTTITV@ | Address of HIMDITV |
| CTTHDS@ | Address of HIMDHDS |
| CTTLMTCH | Pointer to CTT ROW that last matched a completed UOW. Speeds updates. |
| CTTLMTNM | Number of times CTTLMTCH found the correct transaction code. |
| CTTPRFX# | Equate Length of CTTPRFX |
| CTT ROW | DS 0H |
| CTTTRNCD | Transaction Code |
| CTTTRTOT | Transaction Coders total number of completed transactions |
| CTTTRTO | Of Completed Transactions this many Timed Out on Output Queue |
| CTTIQTTO | Total Input Q Time |
| CTTIQTMX | Maximum Input Q Time |
| CTTIQTMN | Minimum Input Q Time |
| CTTPETTO | Total Program Execution Time |
| CTTPETMX | Maximum Program Execution Time |
| CTTPETMN | Minimum Program Execution Time |
| CTTOQTTO | Total Output Q Time |
| CTTOQTMX | Maximum Output Q Time |
| CTTOQTMN | Minimum Output Q Time |
| CTTTTTTO | Total of Total Transit Times |
| CTTTTTMN | Minimum Total Transit Time |
| CTTTTTMX | Maximum Total Transit Time |
| CTTPGMSW | Total Number Program Switches |
| CTTPGMSX | Maximum Number Program Switches |
| CTTPGMSN | Minimum Number Program Switches |
| CTRL@ | Length of one CTT Row |

Figure 5A:
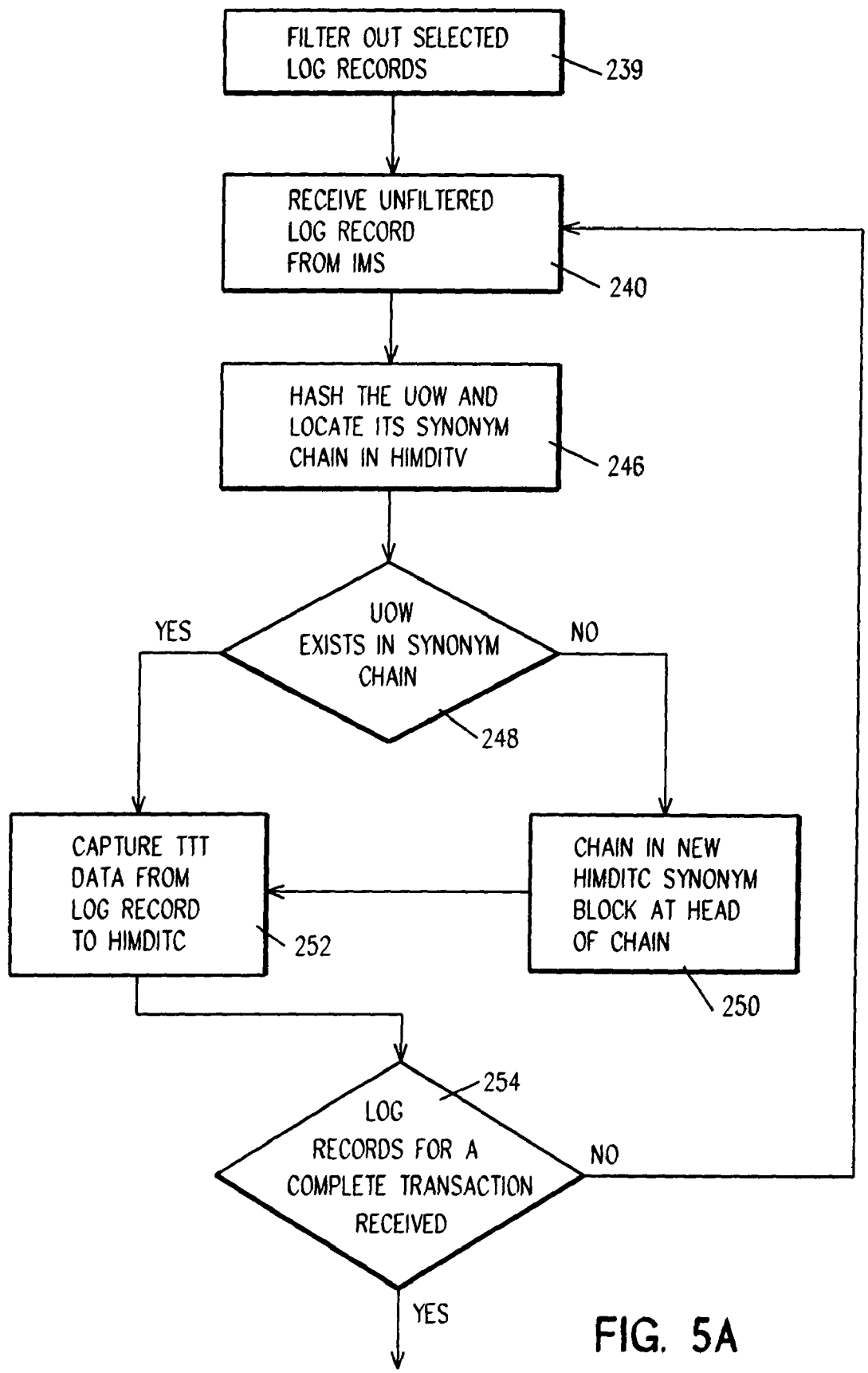

Referring to FIGS. 5A and 5B, log records 104 are processed by the TTT calculator task 112 as follows.

In step 239, the log records 104 are examined to filter out those which are of no interest. This reduces the set of log records to a point that they are as determinate as possible regarding the set required to complete a UOW 104 and store it in the HIMDCTTT 118.

In step 240, calculator task 112 receives a log record 104 from IMS.

In step 246, the UOW 104 is hashed and in step 248 its synonym chain 150 located in the HIMDITV 114. This is done by searching the HIMDITV synonym chain 114 of HIMDITC'S for the UOW 104. If it exists, in step 252 relevant TTT data is captured from the log record 104 and put in the HIMDITC 184, and the flag set in the HIMDITC 184 (see Table 4) corresponding to the log record 104 processed. If it does not exist, in step 250 a new HIMDITC synonym chain 150 block 182 is chained in at the head of the chain 150, and then in step 252 the log record 104 information captured.

When in step 254 it is determined that the log records 104 required to complete a transaction have all arrived, in step 256 the HIMDCTT block 118 is updated with the TTT data 160 and in step 258 the HIMDITC 184 is removed from the HIMDITV synonym chain 150.

Incomplete UOWs 104 are flushed from chain 150 for one of two reasons: (A) A long running transaction has exceeded some predetermined limit (TTTTOLIM=) 126 and enough information is available to infer TTT 118 data; and (B) When a UOW 104 has insufficient information to determine TTT data due to some unexpected log record pattern. This is part of the garbage collection process.

ALTERNATIVE EMBODIMENTS

Figure 6:
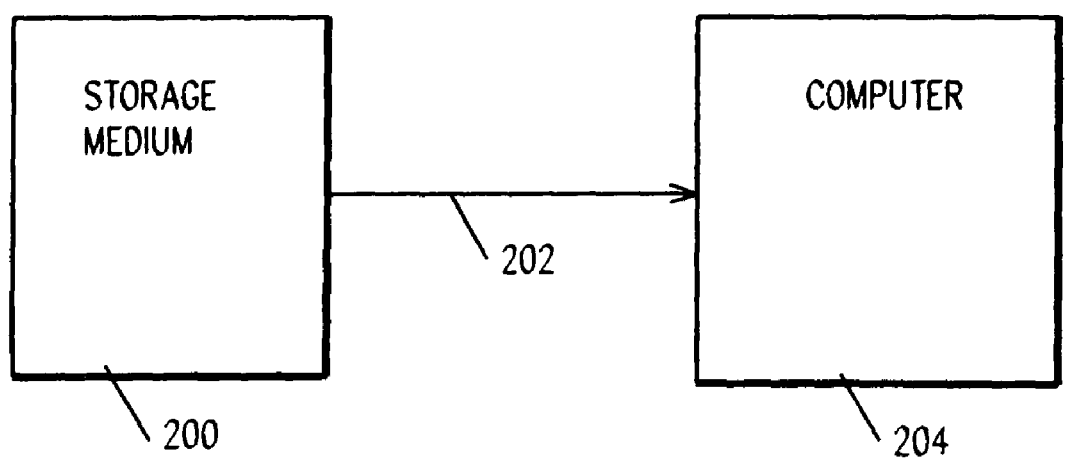
FIG. 6 is a high level system diagram illustrating a program storage device readable by a machine, tangibly embodying a program of instructions executable by a machine to perform method steps for monitoring performance with user adjustable tuning bias.

It will be appreciated that, although specific embodiments of the invention have been described herein for purposes of illustration, various modifications may be made without departing from the spirit and scope of the invention. Referring to FIG. 6, in particular, it is within the scope of the invention to provide a computer program product or program element, or a program storage or memory device 200 such as a solid or fluid transmission medium, magnetic or optical wire, tape or disc, or the like, for storing signals readable by a machine as is illustrated by line 202, for controlling the operation of a computer 204, such as a host system or storage controller, according to the method of the invention and/or to structure its components in accordance with the system of the invention.

Further, each step of the method may be executed on any general purpose computer, such as IBM Systems designated as series, series, series, and series, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A host computer system comprising a processor, the host computer system for monitoring a computer software system by reading log records written by said software system to determine performance of said software system relative to response time to end users, the host computer comprising:
   a first user actuated tuning knob for allocating space in memory for performance monitoring;
   a second user actuated tuning knob for a specifying time out value for in-flight units of work;
   a transaction monitor responsive to said first and second user actuated tuning knobs for accumulating, in synonym chain cells in said space, timing statistics for a plurality of said in-flight units of work;
   said memory including an in-flight transactions vector table for anchoring synonym chains of in-flight transaction cells;
   said in-flight transaction cells for accumulating time statistics for in-flight transactions;
   said memory including a completed transactions table for storing time statistics for completed transactions;
   a monitor for receiving from said computer software system a transaction log record for a unit of work;
   said monitor hashing said first transaction log record to select from said vector table an anchor to an in-flight transaction cells chain corresponding to said unit of work;
   said monitor for searching said in-flight transaction cells chain for said unit of work;
   said monitor further responsive to finding said unit of work in said in-flight transaction cells chain for capturing to said in-flight transaction cell timing statistics from said transaction log record;
   said monitor further responsive to not finding said unit of work in said in-flight transaction cells chain for chaining a new in-flight transaction cell to said chain and capturing to said new in-flight transaction cell timing statistics from said transaction log record;
   said monitor further for determining if said transaction log record completes a transaction and, if so, updating said completed transactions table with timing statistics for said transaction and removing said in-flight transaction cell from said in-flight transaction cells chain; and
   said monitor further for determining responsive to said second tuning knob if a selected unit of work being accumulated in a selected in-flight transaction cell has timed out, and if so removing from said selected in-flight transaction cell from said in-flight transaction cell chain and selectively updating said completed transactions table with timing statistics for said selected unit of work.

2. A program storage device readable by a machine, tangibly embodying a program of instructions executable by a machine to perform method steps for monitoring a computer software system by reading log records written by said software system to determine performance of said software system relative to response time to end users, said method comprising:
   adjustably tuning performance evaluation bias between processor and memory consumption;
   responsive to said bias, monitoring performance of said computer software system with respect to transaction time parameters;
   receiving from a user a first tuning parameter for allocating memory for said monitoring performance and a second tuning parameter for specifying time out for in-flight units of work;
   initializing said memory with an in-flight transactions vector table for anchoring synonym chains of in-flight transaction cells;
   accumulating time statistics for in-flight transactions in said in-flight transaction cells;
   initializing said memory with a completed transactions table for storing time statistics for completed transactions;
   receiving from said computer software system a transaction log record for a unit of work;
   hashing said first transaction log record to select from said vector table an anchor to an in-flight transaction cells chain corresponding to said unit of work;
   searching said in-flight transaction cells chain for said unit of work;
   responsive to finding said unit of work in said in-flight transaction cells chain, capturing to said in-flight transaction cell timing statistics from said transaction log record;
   responsive to not finding said unit of work in said in-flight transaction cells chain, chaining a new in-flight transaction cell to said chain and capturing to said new in-flight transaction cell timing statistics from said transaction log record; and
   determining if said transaction log record completes a transaction and, if so, updating said completed transactions table with timing statistics for said transaction and removing said in-flight transaction cell from said in-flight transaction cells chain.

3. A program storage device readable by a machine, tangibly embodying a program of instructions executable by a machine to perform method steps for monitoring a computer software system by reading log records written by said software system to determine performance of said software system relative to response time to end users, said method comprising:
   adjustably tuning performance evaluation bias between processor and memory consumption;

responsive to said bias, monitoring performance of said computer software system with respect to transaction time parameters;

receiving from a user a first tuning parameter for allocating memory for said monitoring performance and a second tuning parameter for specifying time out for in-flight units of work;

initializing said memory with an in-flight transactions vector table for anchoring synonym chains of in-flight transaction cells;

accumulating time statistics for in-flight transactions in said in-flight transaction cells;

initializing said memory with a completed transactions table for storing time statistics for completed transactions;

receiving from said computer software system a transaction log record for a unit of work;

hashing said first transaction log record to select from said vector table an anchor to an in-flight transaction cells chain corresponding to said unit of work;

searching said in-flight transaction cells chain for said unit of work;

responsive to finding said unit of work in said in-flight transaction cells chain, capturing to said in-flight transaction cell timing statistics from said transaction log record;

responsive to not finding said unit of work in said in-flight transaction cells chain, chaining a new in-flight transaction cell to said chain and capturing to said new in-flight transaction cell timing statistics from said transaction log record;

determining if said transaction log record completes a transaction and, if so, updating said completed transactions table with timing statistics for said transaction and removing said in-flight transaction cell from said in-flight transaction cells chain; and determining responsive to said second tuning parameter if a selected unit of work being accumulated in a selected in-flight transaction cell has timed out, and if so removing from said selected in-flight transaction cell from said in-flight transaction cell chain and selectively updating said completed transactions table with timing statistics for said selected unit of work.

* * * * *